United States Patent
Chen et al.

[11] Patent Number: 5,890,788
[45] Date of Patent: Apr. 6, 1999

[54] ANAMOPHIC OPTICAL SYSTEM

[75] Inventors: Chungte W. Chen, Irvine; Ronald G. Hegg, Vista, both of Calif.; Jonathan L. Dugdale, Burleson; John W. Schaefer, Colleyvile, both of Tex.

[73] Assignee: Raytheon Company, Lexington, Mass.

[21] Appl. No.: 988,326

[22] Filed: Dec. 10, 1997

[51] Int. Cl.⁶ .................................................. G03B 21/28
[52] U.S. Cl. ........................... 353/98; 434/40; 434/44; 353/69; 353/99
[58] Field of Search ......................... 353/98, 79, 38, 353/13, 69; 359/451, 448, 648, 668; 434/38, 40, 43, 44

[56] References Cited

U.S. PATENT DOCUMENTS

| | | | |
|---|---|---|---|
| 3,620,592 | 11/1971 | Freeman | 353/99 |
| 3,784,742 | 1/1974 | Burnham et al. | 434/43 |
| 3,880,509 | 4/1975 | Herndon | 353/99 |
| 3,895,861 | 7/1975 | Herndon | 434/44 |
| 4,129,365 | 12/1978 | Aversano et al. | 353/99 |
| 4,234,891 | 11/1980 | Beck et al. | 434/38 |
| 4,390,253 | 6/1983 | Lobb | 353/99 |
| 4,427,274 | 1/1984 | Pund et al. | 353/99 |
| 5,253,116 | 10/1993 | Lacroix | 434/40 |
| 5,515,122 | 5/1996 | Morishima et al. | 353/98 |
| 5,566,370 | 10/1996 | Young | 434/44 |

*Primary Examiner*—William Dowling
*Attorney, Agent, or Firm*—William Schubert

[57] ABSTRACT

An optical system (10) has an image source (12), a first optical element (34), a second optical element (50), and an aperture stop (52). The first optical element (34) is positioned close to the image source (12) to generate anamophic field curvature of matching the display screen (16). The radiation is then directed to the second optical element (50) which corrects astigmatism of the radiation passing from the first optical element (34). The aperture stop (52) is provided adjacent to the second optical element (50). The system may be used in an infinite display optical system where the radiation would be directed through projector 14 to a screen (16). A mirror (18) is positioned to reflect the radiation from the screen (16) to provide an image to a viewer.

11 Claims, 1 Drawing Sheet

ANAMOPHIC OPTICAL SYSTEM

BACKGROUNG OF THE INVENTION

1. Technical Field

The present invention relates to an optical system and, more particularly, to an anamophic optical system for use in projection devices.

2. Discussion

To project a virtual image to a viewer, various types of projection systems have been utilized. Ordinarily, a projection system includes an image source such as a cathode ray tube (CRT). Projection optics receive the radiation from the CRT and transfer the radiation to a screen. A reflective surface such as a spherical mirror is used to recollimate the radiation and provide a virtual image to the user. The image appears to the viewer as being at or near infinity. In this type of system, the projector is only capable of projecting high resolution imagery onto an axially symmetric screen. When the screen is rotationally symmetric, the resolution of the image will be greatly degraded. Drawbacks associated with this type of projector with a rotational screen are small numerical aperture, low resolution due to excessive field curvature, small field of view coverage and the system requires non-spherical mirror to obtain a large vertical field of view.

Ordinarily, in an attempt to obtain wide field of view coverage, either the mirror or the screen has to deviate from a simple geometry. Unfortunately, in order to accomplish this, a significant cost is incurred when the mirror is deviated from a spherical shape. Additionally fabricating a large non-symmetric mirror presents a tremendous technical risk as well as a program schedule risk.

In current simulators like those used for training pilots, the projector ordinarily includes a CRT, projective optics, a screen and a reflective surface such a spherical mirror. To avoid any osculation to the pilots, the screen is located above the pilot. Ordinarily, five projectors are utilized to cover a 200° horizontal field of view with each projector covering approximately a 50°×50° field of view. However, when the field of view becomes greater than about 40°, the performance of the projector degrades significantly due to the presence of a significant mount of astigmatism and field curvature. Thus, it would be desirous to have an optical system which would overcome the above drawbacks and provide a projection system which overcomes these drawbacks.

SUMMARY OF THE INVENTION

According to the teachings of the present invention, an optical system is provided which will provide a projector with a very wide field of view coverage. The field of view coverage is approximately 50° vertical by 225° horizontal field of view. The present invention provides a relatively large numerical aperture as well as high resolution without utilizing non-spherical collating mirrors. The present invention provides a generally anamophic screen which is used to match field curvature of the mirror. Also, the optical system generates a field curvature which matches the shape of the screen.

In the preferred embodiment, an optical system is comprised of the following. An image source such as a CRT generates radiation. A first optical element is positioned adjacent the image source. The first optical element corrects the anamophic field curvature of the radiation generated by the image source. Ordinarily, the first optical element is an anamophic field lens which is positioned adjacent the image source to receive radiation from the image source. A second optical element is positioned to receive the radiation passing through the first optical element. The second optical element corrects the astigmatism of the radiation passing through the first optical element. Since the astigmatism generated by the first optical element is almost constant across the entire field of view, the second optical element with some cylindrical power located near the projector's aperture stop can compensate for the astigmatism generated by the first optical element. The described optical system to be used in an infinite display optical system where a screen is positioned to receive radiation from the exit pupil. Also, a mirror is positioned to reflect the radiation from the screen of a virtual image to a viewer.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
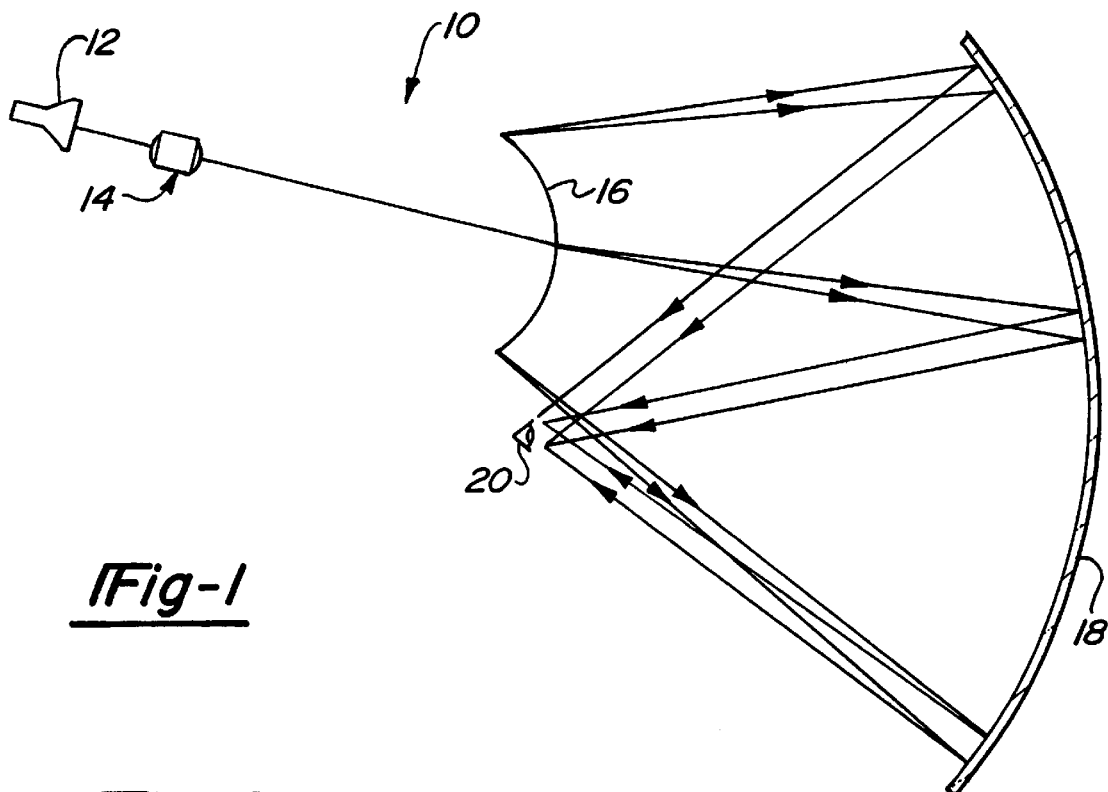
FIG. 1 is a schematic view of an infinite display optical system.

Turning to the figures, particularly FIG. 1, an infinite display optical system is illustrated and designated with the reference numeral 10. The system includes an image source 12, projector optics 14, a screen 16, and a mirror 18. The optics are positioned adjacent the CRT screen and project the radiation from the image source 12 toward the screen 16. The mirror 18 reflects the radiation of the screen 16 to a viewing plane 20. The image source may be a cathode ray tube (CRT) which generates the radiation. The image source 12 ordinarily radiates its rays in a substantially 180° field.

Figure 2:
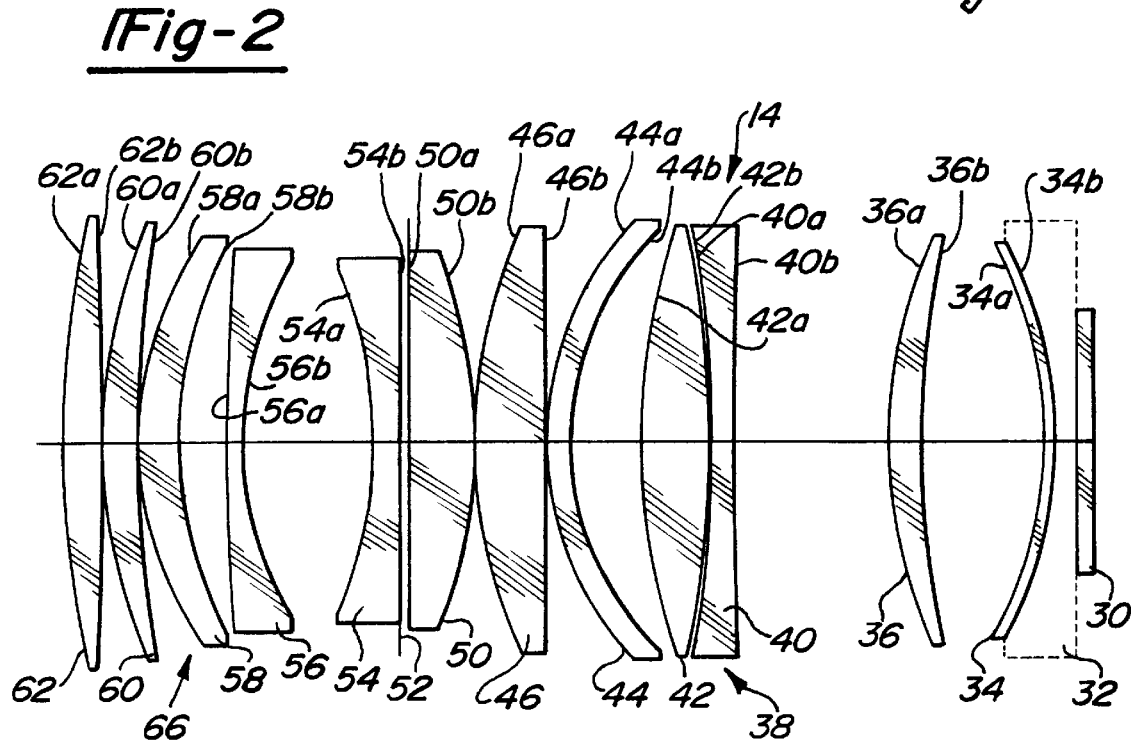
FIG. 2 is an enlarged view of the projector optics of FIG. 1.

The projector optics 14 are best illustrated in FIG. 2. As can be seen in FIG. 2, the optics 14 are positioned very close to the image source 12. Ordinarily, a face plate 30 is positioned abutting the image source 12. A space 32 is present between the image plane 30 and the projector optics 14. The space 32 is ordinarily small, however a coolant such as fluid may fill the space between the projector optics 14 and the image plate 30. This is due to the fact that the image source generates a significant amount of heat which should be dissipated.

Turning to the projector optics 14, a first optical element 34 is positioned next to the face plate 30. The optical element 34 is an anamophic field lens. The anamophic field lens is of a thin shell shape and its geometry can be either saddle shaped, generalized Zernike polynomials, toroid or torus. The anamophic lens generates a field curvature to match the shape of the screen 16.

A second lens 36 is positioned to receive the radiation from the anamophic lens 34. The second lens 36 focuses radiation from the lens 34 and passes the radiation through the projector optics.

The radiation is next passed into a lens group 38 which includes four lenses 40, 42, 44 and 46. The lens group 38 provides the most of the projector's optical power to achieve high numerical aperture.

The optical element 50 is a cylindrical lens which corrects for the astigmatism generated by the anamophic field lens 34. The cylindrical lens 50 may be a simple cylindrical lens, a generally aspheric cylindrical lens and have either a positive or negative optical power. The cylindrical lens 50 is positioned very close to the aperture stop 52.

The front lens optical group 66 which includes lenses 54, 56, 58, 60 and 62 corrects the aberration generated by the front end optics of the projector optics 14 (i.e. lens 50, 38, 36, 34, 32, 30). In fact, the front focus group 66 provides a very compact wide angle optical system. The front lens group 66 is capable of providing the optical system with a large vertical field of view of 50°. The group 66 and lens 36 enables the projector optics 14 to be focused onto the screen 16.

The screen 16 is designed to match the field curvature of the spherical mirror 18. Thus, the screen 16 may have a simple spherical shape, a conic shape, a torus shape, a generally bilateral symmetric shape or it may be described with Zernike polynomials. For smaller field of view, said 30°, a simple spherical screen is generally adequate. However, when a field of view is greater than 40°, a spherical screen is no longer adequate to match the spherical mirror's field curvature. A screen shape such as aspheric or bilateral symmetric shape is necessary to obtain good image quality.

The mirror 18 which reflects the radiation from the screen is preferred to be a spherical shape for cost consideration. Certainly, when required superior display quality, the mirror 18 may have a conic shape, a torus shape, described with Zernike polynomials, or have a generalized bilateral symmetric shape.

The ten lens projector optics 14 enable the projector system to achieve high numerical aperture (i.e. F/1.25). The optical system 10 with the anamophic field lens 34 and the cylindrical lens 50 enable the projector 14 to protect a flat CRT image onto a non-rotationally symmetric screen. The lens group 66 and lens 36 provides focus adjustment.

Table 1 below provides a detailed optical prescription for the projector optics 14 with the surface numbers starting from the wide angle lens group 66 towards the image source 12. The lens surfaces are designated with a and b.

TABLE 1

OPTICAL PRESCRIPTION AND ASPHERIC COEFFICIENTS

| Surf | Radius of Curvature | +/- tol | Clear Aper (½) | Thickness After Surf | +/- tol | Glass Type |
|---|---|---|---|---|---|---|
| 62a | 381.513 | | 86.73 | 14.663 | | BACDS |
| 62b | -2254.041 | | 86.30 | 0.500 | | AIR |
| 60a | 211.300 | | 83.60 | 13.359 | | BACDS |
| 60b | 500.735 | | 82.90 | 0.500 | | AIR |
| 58a | 138.249 | | 77.90 | 15.013 | | BACED5 |
| 58b | 159.851 | | 73.90 | 18.102 | | AIR |
| 56a | 1005.185 | | 72.90 | 6.400 | | EF2 |
| 56b | 133.508 | | 67.30 | 49.024 | | AIR |
| 54a | -168.549 | | 66.20 | 9.814 | | EF2 |
| 54b | 4760.699 | | 69.20 | 3.156 | | AIR |
| 50a | -12406.094 | | 69.70 | 24.802 | | BACD5 |
| 50b | -198.863 | | 72.00 | 0.500 | | AIR |
| 46a | 201.911 | | 81.00 | 26.170 | | BACD16 |
| 46b | * | | 81.00 | -43.173 | | AIR |
| 52 | 0.000 | | 79.55 | 44.157 | | AIR |
| 44a | 125.008 | | 84.00 | 8.500 | | FD60 |
| 44b | 114.766 | | 81.00 | 26.745 | | AIR |
| 42a | 261.155 | | 82.00 | 25.179 | | BACD16 |
| 42b | -414.898 | | 82.00 | 0.913 | | AIR |
| 40a | -458.746 | | 82.00 | 8.849 | | EF2 |
| 40b | 2188.502 | | 81.00 | 58.293 | | AIR |
| 36a | 185.734 | | 78.00 | 12.421 | | BACD5 |
| 36b | 351.448 | | 77.00 | 46.117 | | AIR |
| 34a | -122.261 | | | 4.000 | | PMMA |
| 34b | -126.347 | | | 8.700 | | FLUID |
| 30 | 0.000 | | | 6.500 | | CRT |

Aspheric Equation:

$$z = \frac{cp^2}{1 + \sqrt{1 - (k+1)c^2 p^2}} + dp^4 + ep^6 + fp^8 + w_5(x^2 - y^2) + w_{12}(x^4 - y^4)$$

where $p^2 = x^2 + y^2$   $c = \frac{1}{\text{radius of curvature}}$   $k$ = conic constant d, e, f, = radial aspheric coefficients    $w_a$ = bilateral aspheric coefficients TABLE 1-continued

OPTICAL PRESCRIPTION AND ASPHERIC COEFFICIENTS

| Surf | Rotationally Symmetric Aspheric Coefficients | | | | Asymmetric Coefficients | |
|---|---|---|---|---|---|---|
| | k | d | e | f | w5 | w12 |
| 34a | −1.61500 | .44247e-07 | −.25898e-11 | .32837-15 | −.491931e-3 | .384557e-7 |
| 34b | −1.61500 | .44247e-07 | −.25898e-11 | .32837-15 | −.491931e-3 | .384557e-7 |

*cylindrical lens
X–Z plane radius - 5250.09
Y–Z plane radius - ∞
(+) curvatures are to the right
(+) thickness to the right
all dimensions are in mm unless specified otherwise.

The present invention provides a high resolution anamophic projection optical system with an anamophic screen. The present invention is capable of high numeric aperture, wide field of view, and high resolution with a spherical collimating mirror. The projector optical systems will be utilized in simulators to simulate aircraft. Likewise, these projection systems may be utilized in the entertainment field.

It should be understood that while the invention has been described in connection with particular examples hereof, that various modifications, alterations and variations of the disclosed preferred embodiment may be made after varying the benefits of a study of the specification, drawings and the following claims.

What is claimed is:

1. An optical system comprising:
   an image source
   a first optical element to generate anamophic field curvature to match an anamophic image surface of a screen, said first optical element positioned adjacent said image source for receiving radiation from said image source;
   a second optical element for correcting astigmatism of the radiation passing through said first optical element, said second optical element positioned to receive radiation from said first optical element; and
   an aperture stop, said aperture stop positioned adjacent said second optical element.

2. The optical system according to claim 1, wherein said second optical element has a positive optical power.

3. The optical system according to claim 1, wherein said second optical element has a negative optical power.

4. The optical system according to claim 1, wherein a lens group is positioned between said first and second optical elements to provide a substantial optical power.

5. The optical system according to claim 4, wherein a focusing optical element is positioned between the first and second optical element for focusing the radiation passing from said first optical element to said second optical element.

6. The optical system according to claim 1, wherein a cooling mechanism is positioned between the first optical element and said image source.

7. The optical system according to claim 5, wherein a second focusing optical element is positioned adjacent said aperture stop such that the aperture is between said second focusing optical element and said second optical element.

8. An infinite display optical system comprising:
   an image source
   a first optical element to generate anamophic field curvature to match an anamophic image surface of a screen, said first optical element positioned adjacent said image source for receiving radiation from said image source;
   a second optical element for correcting astigmatism of the radiation passing through said first optical element, said second optical element positioned to receive radiation from said first optical element;
   an aperture stop, said aperture stop positioned adjacent said second optical element;
   a screen positioned to receive radiation from said exit pupil; and
   a mirror positioned to reflect radiation from said screen and provide an image to a viewer.

9. The optical system according to claim 8, wherein said screen has a shape corresponding to the field curvature of the mirror.

10. The optical system according to claim 8, wherein said screen has a shape corresponding to the field curvature generated by the first optical element.

11. The optical system according to claim 10, wherein said mirror has a shape corresponding to the field curvature generated by the first optical element.

* * * * *